United States Patent [19]

Kisaka et al.

[11] 4,294,130
[45] Oct. 13, 1981

[54] TRANSMISSION FOR TRACTOR

[75] Inventors: Hiroyuki Kisaka, Sennan; Makoto Sagata, Kaizuka; Masayoshi Miyahara; Morimitsu Katayama, both of Sakai, all of Japan

[73] Assignee: Kubota Ltd., Japan

[21] Appl. No.: 893,757

[22] Filed: Apr. 5, 1978

[30] Foreign Application Priority Data

Apr. 27, 1977 [JP] Japan .................. 52-51031

[51] Int. Cl.³ .......................................... F16H 37/00
[52] U.S. Cl. .................. 74/15.4; 74/665 GA
[58] Field of Search ............... 74/15.4, 15.8, 342, 74/346, 356, 359, 360, 665 G, 665 GA, 745

[56] References Cited

U.S. PATENT DOCUMENTS

| | | | |
|---|---|---|---|
| 2,975,656 | 3/1961 | Haverlender | 74/745 |
| 3,031,893 | 5/1962 | Doleschalek | 74/15.8 |
| 3,174,349 | 3/1965 | Renker et al. | 74/665 GA |
| 3,354,745 | 11/1967 | Castelet | 74/665 GA |
| 3,916,711 | 11/1975 | Hoyer | 74/745 |
| 3,922,931 | 12/1975 | Osujyo et al. | 74/665 GA |
| 4,023,418 | 5/1977 | Zenker | 74/665 GA |
| 4,106,364 | 8/1978 | Zenker et al. | 74/360 |
| 4,116,090 | 9/1978 | Zenker | 74/665 G |

Primary Examiner—Peter M. Caun
Attorney, Agent, or Firm—Kane, Dalsimer, Kane, Sullivan and Kurucz

[57] ABSTRACT

A transmission for a tractor in which a main shaft to receive engine power, a travelling speed change shaft and a PTO speed change shaft are disposed in parallel with one another. A first travelling speed change means of a hydraulic clutch type is disposed on the travelling speed change shaft and provided with clutch means for backward travelling and first-stage forward travelling. A second travelling speed change means of a hydraulic clutch type is connected to and disposed rearwardly of the main shaft and provided with clutch means for second-stage, third-stage and fourth-stage forward travelling. The second hydraulic clutch type travelling speed change means is so constructed that, in response to power input from the main shaft, the clutch function thereof is performed prior to the speed change function thereof.

9 Claims, 7 Drawing Figures

TRANSMISSION FOR TRACTOR

BACKGROUND OF THE INVENTION

The present invention relates to improvements in a transmission for a tractor of so-called three-shaft construction which comprises a main shaft to receive engine power, a travelling speed change shaft disposed in parallel with the main shaft and provided with a travelling speed change means thereon, and a PTO seed change shaft disposed in parallel with said two shafts and provided with a PTO speed change means thereon.

In a prior art transmission as above-described, an engine clutch must always be disconnected when it is intended to change the travelling speed because the travelling speed change means is of a gear type.

Such speed change operation is however very troublesome. Furthermore, when gears or coupling sleeves in the travelling speed change means are slid immediately after the engine clutch has been disconnected, engaging noises may be produced and engagement parts may be broken, or speed change operation cannot be smoothly carried out.

Nowadays when various speed changes and forward-travelling or backward-travelling speed changes are required with the extended applications of a tractor, simplification of such speed change operation is particularly required.

In case a hydraulic clutch type travelling speed change means is employed instead of the gear type one, the above described problem is solved, whereas there occurs another problem that the overall transmission becomes large because a hydraulic type speed change means is generally larger than a gear type one which has the same performance in speed change stages as the former.

SUMMARY OF THE INVENTION

In view of the foregoing, it is an object of the present invention to provide a transmission for a tractor which has a simple and compact construction in spite of the employment of a hydraulic clutch type travelling speed change means, and in which forward and backward travelling and multiple stages of forward travelling may be achieved.

In order to achieve the above object, the transmission for a tractor in accordance with the present invention comprises; a main shaft to receive engine power, a travelling speed change shaft disposed in parallel with the main shaft, a PTO speed change shaft disposed in parallel with said two shafts, a first travelling speed change means of a hydraulic clutch type mounted on the travelling speed change shaft and having travelling speed change input gears, a PTO speed change means of a mechanical clutch type mounted on the PTO speed change shaft and having plural PTO speed change gears, a plurality of power transmission gears fixed on the main shaft for transmitting power to the travelling speed change input gears and the PTO speed change gears, with at least one of the power transmission gears serving as a dual-purpose transmission gear to transmit power not only to one of the travelling speed change input gears but also to one of the PTO speed change gears, a second travelling speed change means of a hydraulic clutch type connected to a rear end of the main shaft and having travelling speed change output gears, the second travelling speed change means being so constructed that, in response to power input from the main shaft, a clutch function thereof is performed prior to a speed change function thereof, and a plurality of travelling speed change gears fixed on the travelling speed change shaft and engaged with the travelling speed change output gears of the second travelling speed change means.

The transmission according to this invention has two hydraulic clutch type travelling speed change means arranged apart from each other on the travelling speed change shaft and rearwardly of the main shaft, which enables each hydraulic type travelling speed change means to be formed in a relatively small and compact size and to be efficiently and effectively incorporated in the limited space of the transmission.

Furthermore, the second hydraulic clutch type travelling speed change means is connected to the rear end of the main shaft the number of revolutions of which is big and the torque of which is small. It is therefore be formed in a rather small and compact size.

Still furthermore, the second hydraulic type travelling speed change means is adapted to perform its clutch function to its speed change function, and is located at a position different from that of the first hydraulic clutch type travelling speed change means. Its clutch shaft may therefore be formed smaller in diameter and shorter in length (front-rear direction).

It is further noted that the second hydraulic clutch type travelling speed change means is located within the area of oil bath, whereby sufficient cooling effect thereto may be obtained.

It is still further noted that a plurality of power transmission gears for driving the first hydraulic clutch type travelling speed change means and the mechanical clutch type PTO speed change means are disposed on the main shaft. The number of parts is therefore advantageously reduced.

In addition to the advantages mentioned above, multiple speed changes required for extended applications of a tractor may quickly and readily carried out and no damages to each part or noises are expected, since no operation of disconnecting the engine clutch is required because of the use of hydraulic clutch type travelling speed change means.

Other objects and advantages of the present invention will be evident from the following detailed description of the invention.

BRIEF DESCRIPTION OF THE DRAWINGS

An embodiment of transmission for a tractor in accordance with the present invention is shown in the accompanying drawings wherein.

DESCRIPTION OF A PREFERRED EMBODIMENT

Figure 1:
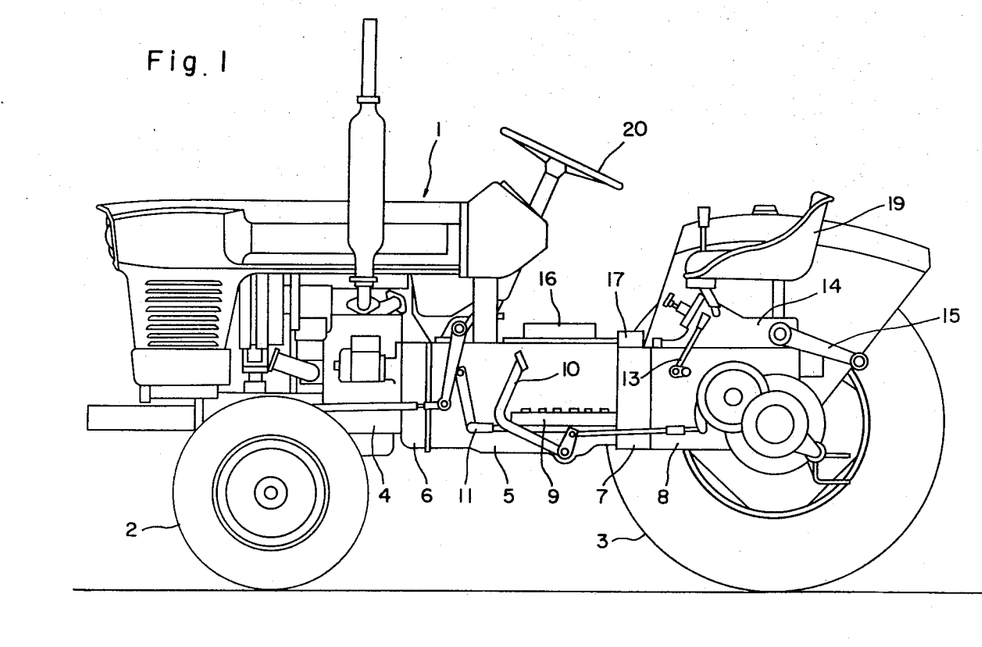
FIG. 1 shows the appearance of a tractor with portions partly omitted.

Referring now to FIG. 1 showing the appearance of a tractor, detailed description will be made of an embodiment of the present invention.

A tractor main body is generally designated by 1, and front wheels and rear wheels by 2 and 3, respectively. An engine 4 is loaded near the front part of the tractor main body 1. A main transmission case 5 is provided at the front part thereof with a clutch housing 6 in a unitary construction therewith, which is connected to an engine frame. An intermediate case 7 is held by and between the main transmission case 5 and an auxiliary transmission case 8. The main transmission case 5, the intermediate case 7 and the auxiliary transmission case 8 connected to each other in this order hold on oil tank in common and constitute a tractor car body.

A pair of right and left steps 9 project from the both sides of the main transmission case 5, respectively. Adjacent these steps 9, there are disposed a braking pedal (not shown) as brake operating means and a clutch pedal 10 as clutch operating means, which are adapted to be pressed.

Figure 2:
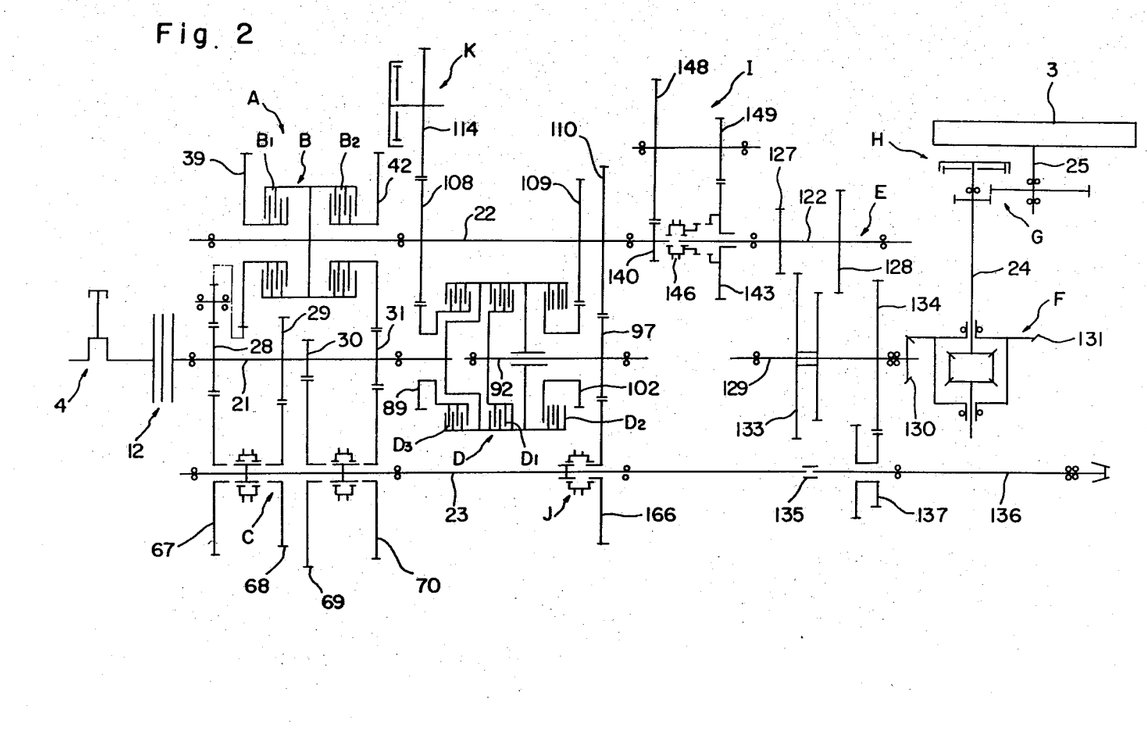
FIG. 2 is a diagram showing the whole power transmission system.

The clutch pedal 10 is provided for connecting or disconnecting an engine clutch 12, shown in FIG. 2, through a linkage mechanism 11, namely, the clutch pedal 10 is normally constructed so as to disconnect the clutch 12 when pressed.

In FIG. 1, auxiliary transmission operating means is generally designated by 13, and the operating lever thereof is disposed at the side of the auxiliary transmission case 8. Hydraulic means 14 is disposed on the auxiliary transmission case 8 for oscillating a pair of right and left lifting arms 15 up and down for lifting and lowering a working machine attached to a rear portion of the tractor body (not indicated in FIG. 1).

A lid 16 is placed on the upper opening of the main transmission case 5. In the lid 16, a valve assembly for the hydraulic clutch type transmissions is incorporated as shown in FIGS. 3 and 4, and adjacent the lid 16, a PTO transmission operating means (not shown) is disposed.

Figure 3:
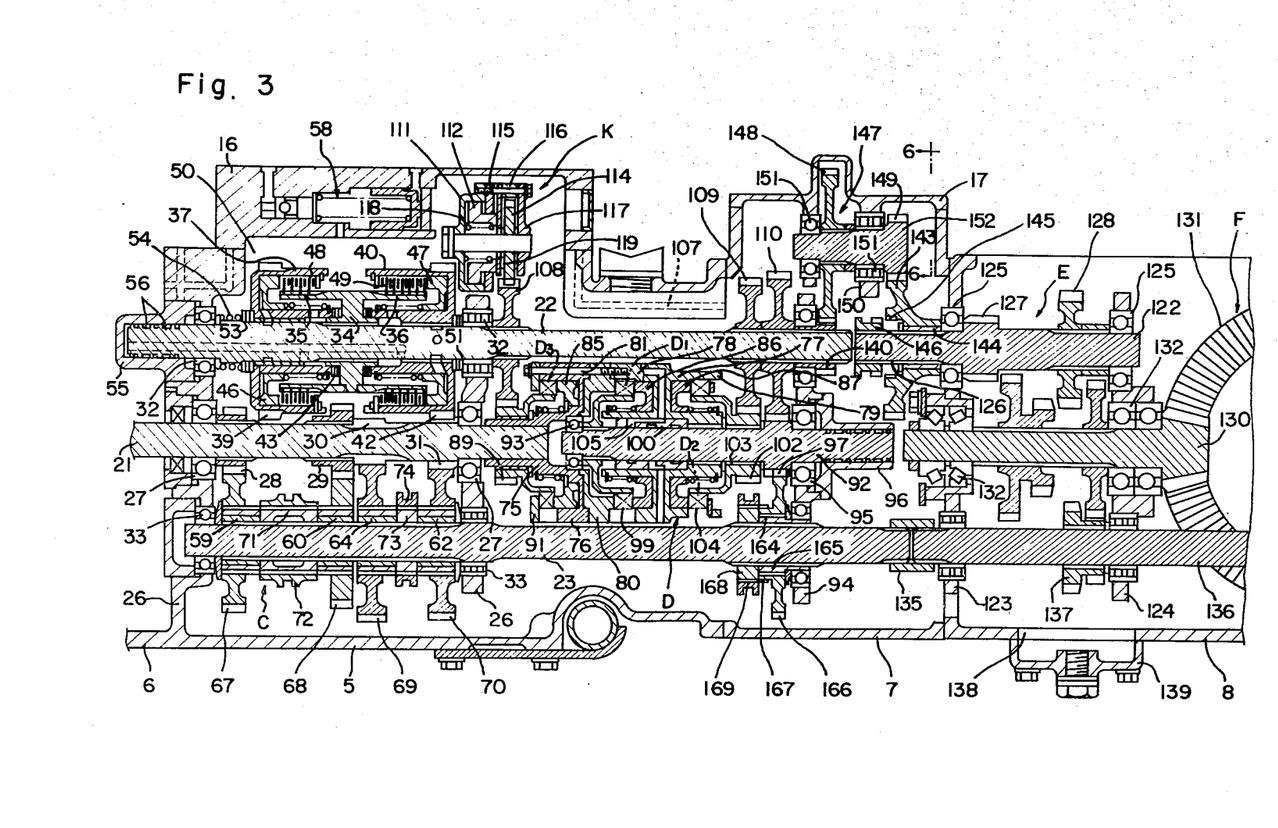
FIG. 3 is a sectional view showing in detail the main portions in FIG. 2.
Figure 4:
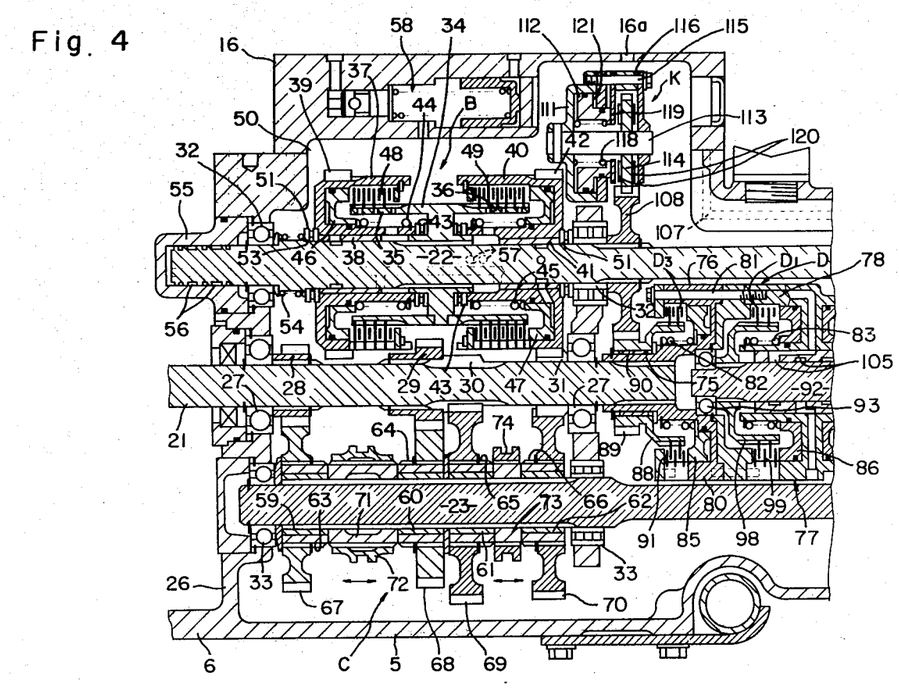
FIG. 4 is an enlarged sectional view showing the left half of FIG. 3.
Figure 5:
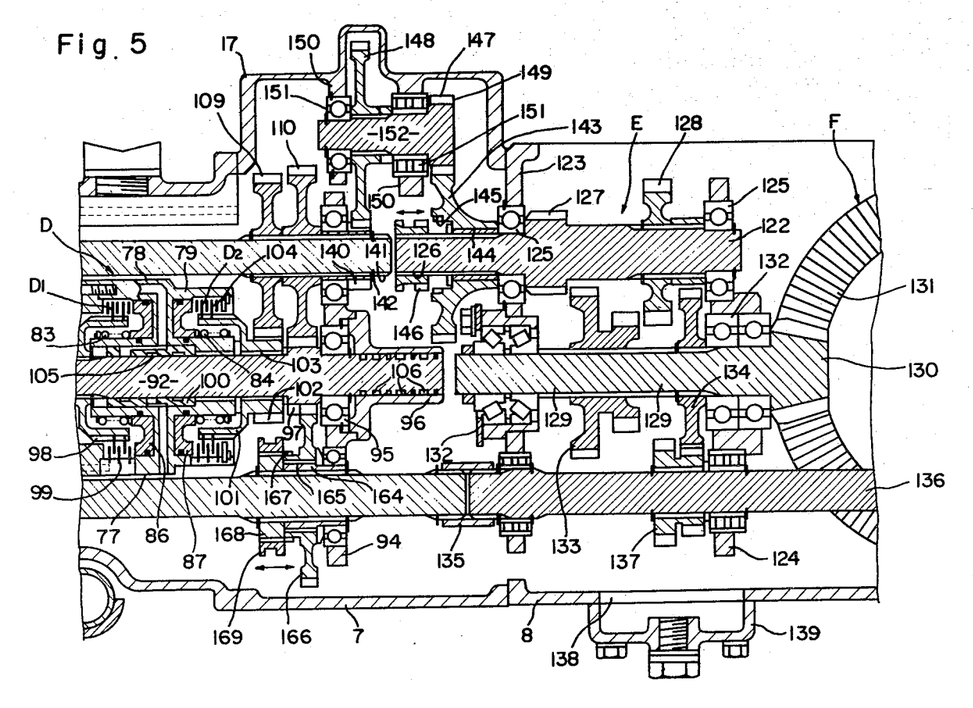
FIG. 5 is an enlarged sectional view showing the main portions of the right half of FIG. 3.
Figure 6:
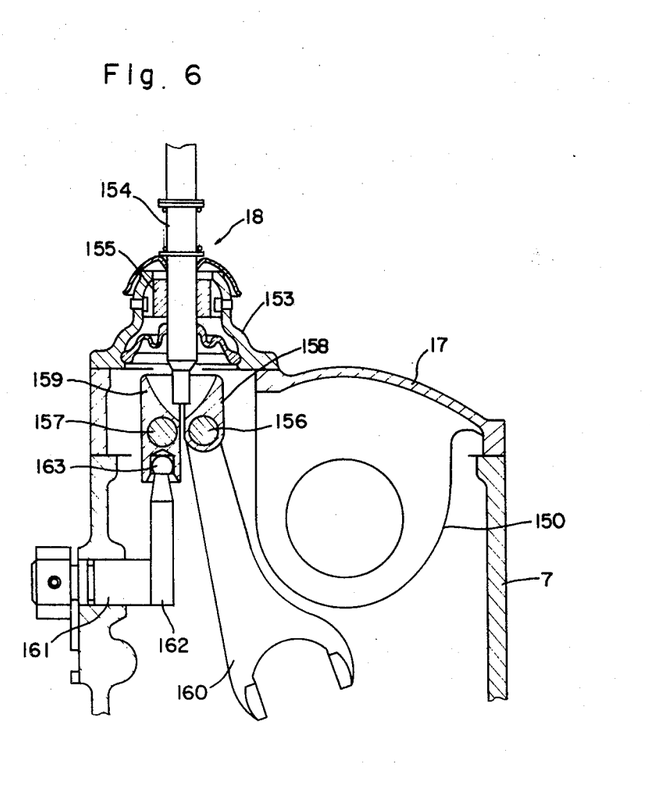
FIG. 6 is a fragmentary sectional view taken along the line 6—6 of FIG. 3.

A lid 17 is placed on the upper surface of the intermediate case 7, and as shown in FIG. 6 there is disposed switchover operating means 18 for selectively operating a super-reductiongear or a traction starting means incorporated in the intermediate case 7 as shown in FIGS. 3 and 5. Such operating means and a steering means 20 are disposed so as to be operated by an operator sitting on a seat 19 provided above the auxiliary transmission case 8.

Referring now to FIG. 2 schematically showing the power transmission system, main transmission A is constituted by a first hydraulic clutch type transmission B and a geared transmission C which are disposed in parallel with and at the both sides with respect to a main shaft 21, namely above and below, in FIG. 2.

The first hydraulic clutch type transmission B is provided for the travelling system and the geared transmission C for the PTO system, and transmission toothed wheels thereof are adapted to be driven by power transmission toothed wheels disposed on the main shaft 21.

The main transmission A is housed in the main transmission case 5, and the first hydraulic clutch type transmission B for the travelling system is constituted by clutch means $B_1$ for backward travelling and clutch means $B_2$ for first-stage forward travelling, the clutch means $B_1$ and $B_2$ being disposed in series on a travelling counter shaft 22 (which may also be called a clutch shaft) disposed above the main shaft 21.

Geared transmission C for the PTO system is shown in FIG. 2 as four-stage transmission of the always engaging type, which is disposed on the PTO transmission shaft 23 and provided with four rotatable transmission toothed wheels, each transmission toothed wheel having a diameter different from each other.

A second hydraulic clutch type transmission D different from the first hydraulic clutch type transmission B, is constituted by, for example, three kinds of second-, third- and forth-stage clutch means $D_1$, $D_2$ and $D_3$ as shown in FIG. 2. As apparent from the description to be made later, the second hydraulic clutch type transmission D is so constructed that, in response to input from the main shaft 21, the clutch function thereof is performed prior to the speed change function thereof.

Auxiliary transmission E is shown in FIG. 2 as the geared type capable of providing auxiliary two-stage speed change, and housed in the auxiliary transmission case 8 together with differential gear F. A pair of right and left deflection yoke shafts 24 disposed at both sides of the differential gear F extend outwardly therefrom and constructed so as to rotate the rear wheels 3 by a rear wheel shaft 25 through final reduction gear G. Brake means H are disposed at the ends of the yoke shafts 24, respectively.

Super-reduction gear I is incorporated in the intermediate case 7, and a traction starting device J is incorporated in the intermediate case 7 on the PTO driving shaft.

Referring now to FIGS. 3 and 4 showing in detail the main transmission A, the main shaft 21 is secured to front and rear partition walls 26 of the main transmission case 5 by a pair of front and rear bearings 27. Splined toothed wheels for power transmission 28, 29, 30 and 31 are fitted in the main shaft 21 axially at intervals, each toothed wheel having a diameter different from each other. Largest diameter toothed wheel 29 and smallest diameter toothed wheel 30 are disposed at the center part between the bearings 27 and adjoin each other. Other toothed wheels 28 and 31 are disposed at the front and rear sides with respect to the toothed wheels 29 and 30, respectively. Namely, the largest diameter toothed wheel 29 is located so as to lie halfway between the backward-travelling and forward-travelling clutch means $B_1$ and $B_2$. Power from the engine 4 may or may not be transmitted to the main shaft 21 by the engine clutch 12 and the toothed wheels 28, 29, 30 and 31 are rotated together with the main shaft 21.

The PTO transmission shaft 23 and the travelling transmission shaft 22 are disposed in parallel with each other at above and below the main shaft 21 in FIG. 2, respectively. The transmission shaft 22 is secured to the front and rear partition walls 26 of the main transmission case 5 by a pair of bearings 32, and the PTO transmission shaft 23 by a pair of bearings 33, thus forming so-called three-shaft construction.

The rear end of the main shaft 21 slightly projects from the partition wall 26, while the upper and lower transmission shafts 22 and 23 are extended in parallel with each other into the intermediate case 7.

As mentioned earlier, the first hydraulic clutch type transmission B for the travelling system is constituted by forward-travelling clutch means $B_1$ and backward-travelling clutch means $B_2$, these clutch means $B_1$ and $B_2$ being disposed in series on the transmission shaft (clutch shaft) 22. Detailed description will now be made of this transmission B.

As shown in FIGS. 3 and 4, a transmission member 34 has a pair of inner hubs 35 and 36 and is securely fitted into the clutch shaft 22. A clutch body 37 for backward travelling is rotatably fitted into the clutch shaft 22 through a metal member 38 and is provided at the periphery thereof with a transmission toothed wheel 39 adapted to be interlockingly engaged with a toothed wheel 28 on the main shaft 21 through an intermediate toothed wheel (not shown).

A clutch body 40 for forward travelling is rotatably fitted into the clutch shaft 22 through a metal member 41, and is provided at the periphery thereof with a transmission toothed wheel 42 always engaged with a toothed wheel 31 on the main shaft 21. A thrust bearing 43 is held by and between a pair of clutch bodies 37 and 40 disposed at the front and rear sides with respect to the transmission member 34. Fitted in the clutch bodies 37 and 40 are actuators 46 and 47, respectively, which may slide against springs 44 and 45, respectively, and clutch plates 48 and 49 are disposed between the peripheries of the inner hubs 35 and 36, and the clutch bodies 37 and 40, respectively, thus providing complete clutch packs. In accordance with this embodiment, four clutch plates 48 and six clutch plates 49 are disposed, but the number of clutch plates may be freely determined.

Thus completely packed first hydraulic clutch type transmission B is incorporated into the main transmission case 5 from the upper opening 50 thereof, and is assembled by inserting the clutch shaft 22 from the rear side in the embodiment shown in FIG. 4.

In such assembled condition, clutch bodies 37 and 40 are journalled by thrust bearings 51 disposed at the front and rear sides, respectively.

The front thrust bearing 51 is positioned by a step 53, and spring-loaded by an elastic member 54 mounted on the clutch shaft 22, and fatigue of or damage to the elastic member 54 is thus greatly reduced by the step 53.

In FIGS. 3 and 4, a coil spring is used as elastic member 54, but a belleville spring may also be utilized.

In FIGS. 3 and 4, a seal cap 55 serving also as bearing cap is disposed at the front end of the clutch shaft 22 and is securely fitted in the partition wall 26. In accordance with the embodiment shown in FIG. 4, two peripheral grooves 56 are formed on that periphery of the clutch shaft 22 which is covered with the seal cap 55. Three oil passages 57 are axially formed in the clutch shaft 22, each passage communicating with each peripheral groove 56, and a first passage thereof communicates with the cylinder chamber 181 of the actuator 46, a second one communicates with the cylinder chamber 182 of the actuator 47 and a third one is for cooling or lubricating the clutch plates 48 and 49.

The valve assmebly 58 for each hydraulic clutch type transmission is incorporated in the lid 16 placed on the main transmission case operating 50 as shown in FIGS. 3 and 4. The oil in the tractor body is, while being filtered, sucked by a pump (not shown) by starting the engine, and the oil passages are formed so as to send thus highly pressurized oil to the valve assembly 58.

The highly pressurized oil may therefore be sent to each actuator 46 or 47 by switching operation of the valve assembly 58.

Description will now be made of the geared transmission C for the PTO system by referring to FIGS. 3 and 4.

Into the PTO transmission shaft 23 disposed in parallel with and below the main shaft 21, floating sleeves 59, 60, 61 and 62 are rotatably fitted axially at intervals. With spaces for engagement portions 63, 64, 65 and 66 left, transmission toothed wheels 67, 68, 69 and 70 are securely fixed to the floating sleeves 59, 60, 61 and 62, respectively, by splines or the like. As apparent from FIG. 4, PTO top-speed toothed wheel 68 and low-speed toothed wheel 69 are disposed at the center part between the bearings 33 and adjoin each other, and always engaged with the toothed wheel 29 and the toothed wheel 30 on the main shaft, respectively. PTO second-speed toothed wheel 70 and third-speed toothed wheel 67 are disposed at the rear and front sides with respect to the toothed wheels 68 and 69 and always engaged with toothed wheels 28 and 31 on the main shaft 21, respectively.

A fixed sleeve 71 having a diameter same as the floating sleeves is securely fixed to the transmission shaft 23 between the third-speed and top-speed toothed wheels 67 and 68. A slidable joint sleeve 72 is fitted in the fixed sleeve 71 by splines or the like, the slidable joint sleeve 72 being engageable with the engagement portions of 63 and 64 of the floating sleeves 59 and 60. A fixed sleeve 73 having a diameter same as the floating sleeves is securely fixed to the transmission shaft 23 between the PTO low-speed toothed wheel 69 and second-speed toothed wheel 70. A slidable joint sleeve 74 is fitted in the fixed sleeve 73 by splined or the like, the slidable joint sleeve 72 being engageable with the engagement portions 65 and 66 of the floating sleeves 61 and 62. In such a construction, when the joint sleeve 72 is slid in the left hand direction in FIGS. 3 and 4, PTO third-speed may be provided, and when slid in the right hand, PTO top-speed may be provided. On the other hand, when the joint sleeve 74 is slid in the left hand in FIGS. 3 and 4, PTO low-speed may be provided, and when slid in the right hand, PTO second-speed may be provided.

In accordance with the embodiment shown in FIGS. 3 and 4, the largest diameter toothed wheel 29 on the main shaft 21 is securely disposed at the center part between the bearings, and the clutch bodies 37 and 40 on the clutch shaft 22 are disposed at the front and rear sides with respect to said toothed wheel 29, so that the toothed wheel 29 may be inserted into the space between the clutch bodies 37 and 40, whereby the distance between the main shaft 21 and the clutch shaft 22 (vertical distance in the actual) may be reduced, thus permitting vertically compact designing. As shown in FIGS. 3 and 5, the second hydraulic clutch type transmission D to be located at the rear portion of the main shaft 21 is disposed in the main transmission case 5 between the clutch shaft 22 and the PTO transmission shaft 23 which are disposed in parallel with, and above and below the main shaft 21.

In FIGS. 3 and 5, input coupling 75 has a cylinder portion 76 and the splined cylindrical boss thereof is fitted in the rear projecting end of the main shaft 21.

A clutch body 77 has cylinder portions 78 and 79 facing in opposite directions. Supporting member 80 is disposed between the cylinder portion 78 of the clutch body 77 and the cylinder portion 76 of the input coupling 75, and is securely fixed by a plurality of bolts 81. Fitted in the cylinder portions 76, 78 and 79 are actuators 85, 86 and 87, which may slide against return springs 82, 83 and 84, respectively.

A clutch mounting board 88 has maximum speed pinion 89 integrally constructed therewith and is supported by a needle bearing 90 in this embodiment, the pinion 89 being rotatably fitted on the cylindrical boss of the input coupling 75.

Hydraulic clutch plates 91, for example two plates, to be operated by the actuator 85, are disposed between the clutch mounting board 88 and the input coupling 75.

The front end of a clutch output shaft 92 is inserted into the cylindrical boss of the input coupling 75, and is formed rotatable by means of a pilot bearing 93. The rear end of the output shaft 92 is secured to the partition wall 94 of the intermediate case 7 by means of bearing 95, and is covered by a seal cap 96 also serving as bearing cap. As apparent from FIGS. 3 and 5, the clutch output shaft 92 is disposed co-axially with the main shaft 21 on the extended axial line thereof.

A clutch mounting board 98 for the smallest diameter toothed wheel 97 disposed at the rear end of the clutch output shaft 92, is inserted into a cylinder portion 78, and hydraulic clutch plate 99 to be operated by an actuator 86 is disposed between the cylinder portion 78 and the clutch mounting board 98. The clutch body 77 is rotatable with respect to the clutch output shaft 92 through an oil distribution metal member 100 fitted in the clutch output shaft 92. A clutch mounting board 101 is inserted into the cylinder portion 79 of the clutch body 77. The clutch mounting board 101 is provided at the cylindrical boss thereof with a toothed wheel 102 integrally constructed therewith, and is rotatably fitted in the clutch output shaft 92 through a needle bearing 103. Hydraulic clutch plates 104 are disposed between the clutch mounting board 101 and the cylinder portion 79, the clutch plate 104 being operated by an actuator 87. The smallest diameter toothed wheel 97 is integrally constructed with the clutch output shaft 92, and is disposed at the rear side with respect to the toothed wheel 102 of the clutch mounting board 101. Three oil passages 105 are formed at the oil distribution metal member 100, and oil may be sent to the actuators 85, 86 and 87 of the cylinder portions 76, 78 and 79, respectively, through the oil passages 105 of the oil distribution metal member 100. Each of three oil passages 105 communicates with each of three individual peripheral grooves 106 disposed at the seal cap 96 of the clutch output shaft 92 through each of oil passages (not shown) axially defined in the clutch output shaft 92. Oil may be sent from the valve assembly 58 to the peripheral grooves 106 through oil passages 107 defined in the wall of the main transmission case 5 and oil passages (not shown) defined in the wall, for example, partition wall 94 of the intermediate case 7.

The second hydraulic clutch type transmission D constituted by second-stage, third-stage and forth-stage forward travelling clutch means $D_1$, $D_2$ and $D_3$, may be assembled from the rear side of the main transmission case 5, and axial movement, i.e. backlash, may be prevented by the pilot bearing 93 and the supporting member 80 thereof. Furthermore, the largest toothed wheel 89 is fitted in the main shaft 21, thus permitting the toothed wheel 89 to be formed relatively thick. In addition, it may be expected that the second clutch type transmission D is wholly cooled and lubricated without sending cooling oil, because the transmission D is subjected to the oil bath of the main transmission case 5.

As shown in FIGS. 3 and 5, transmission toothed wheels 108, 109 and 110 having diameter different from each other are securely fitted in the rearwardly projecting portion of the clutch shaft 22. The transmission toothed wheel 108 is always engaged with the toothed wheel 89 of the forward-travelling forth-stage clutch means $D_3$ of the secnd hydraulic clutch type transmission D, and the transmission toothed wheel 109 with the toothed wheel 102 of the forward-travelling third-stage clutch means $D_2$, and the transmission toothed wheel 110 with the toothed wheel 97 of the forward-travelling second stage clutch means $D_1$. In such a construction, when highly pressurized oil is so sent that the actuators 85, 86 and 87 of the second hydraulic clutch type transmission D constituted by three clutch means in series may slide against the springs 82, 83 and 84, respectively, transmission torques of which speed has been changed through the toothed wheels 89 and 108, the toothed wheels 102 and 109, and the toothed wheels 97 and 109, will be transmitted to the clutch shaft 22. As apparent from the arrangement described hereinbefore, the second hydraulic clutch type transmission D is so constructed that the clutch function thereof is performed prior to the speed change function thereof in the power transmission.

As probably already understood, the first hydraulic clutch type transmission B for forward travelling and backward travelling is disposed above the main shaft 21, and the second hydraulic clutch type transmission D for forward travelling is disposed on the extended line of the main shaft 21, namely, the second transmission D is located at the part in which the frequency of revolutions is big and the torques is small, thus enabling to form a small and compact transmission D to be incorporated within the limited small space between the clutch shaft 22 and the PTO transmission shaft 23. In addition, the first hydraulic clutch type transmission B in accordance with this embodiment may readily provide multiple speed changes, and independent oil holes may be formed even though the diameter of the clutch shaft 22 is small, because the first transmission B is constituted by two clutch means $B_1$ and $B_2$ on the clutch shaft 22.

In a geared transmission, speed change operation should be carried out always after disconnecting the engine clutch regardless of the always engaging type or the selective engaging type, and such speed change operation is very troublesome when various speed changes or forward travelling and backward travelling speed changes are required with the extended applications of tractor. However, the present invention using hydraulic clutch type transmissions may readily and conveniently carry out such operation.

However, when hydraulic clutch type transmissions are used, the clutch shaft 22 rotates by the force of inertia at each time of speed change operation. For preventing such inertial rotation, following measures are taken.

In FIGS. 3 and 4, inertial rotation prevention brake means K comprises brake housing 111 constructed integrally with or separatedly from the main transmission case 5, an actuator 112 slidably fitted in the cylinder portion of the brake housing 111, a toothed wheel shaft 113 securely supported by the brake housing 111 and disposed in parallel with and above the clutch shaft 22, a braking toothed wheel 114 rotatably fitted in and supported by the toothed wheel shaft 113 and always engaged with the toothed wheel 108 fitted in the clutch shaft 22, a lid 117 fixed by bolt 115 at the opposite side to the housing 111 and having an opening 116 radially disposed, an elastic member 118 for spring-loading the actuator 112 against the braking toothed wheel 114, and a pressing auxiliary member 119 sliding with the bolt 115 being as guide member in order to increase the pressing area of the actuator 112, linings 120 being applied to the both sides of the braking toothed wheel 114.

In such a construction, pressure exerted to the cylinder portion 121 in FIG. 4 may be released at each speed change operation, whereby the actuator 112 and the pressing auxiliary member 119 in a unitary construction therewith are advanced from the position as shown In FIG. 3 toward the braking toothed wheel 114 by elastic motion of the elastic member 118, so as to hold and fix the braking toothed wheel 114 which is in engagement with the toothed wheel 108 on the clutch shaft 22, thus preventing inertial rotation of the clutch shaft 22. There is provided an advantage that torque applied to the brake means becomes large by engaging the braking toothed wheel 114 with the large diameter toothed wheel 108 on the clutch shaft 22. After carrying out the speed change operation, sending highly pressurized oil to the cylinder portion 121 will separate the actuator 112 and the auxiliary member 119 from the braking toothed-wheel 114 against the elastic member 118, whereby the braking toothed wheel 114 may be idled. When drain oil is sent at each speed change operation to the linings 120 from the valve assembly 58 through oil passage 16a defined in the lid 16 co-axially with the opening 116, the linings 120 may be cooled and lubricated, thus improving its service life. It is a matter of course that drain oil may be sent to the housing 111 and the lid 117 entirely so as to cool them from the outside thereof.

In accordance with the embodiment shown in FIGS. 3 and 4, the brake means K is disposed at the opening 50 of the main transmission case 5, but the brake means K may be so constructed that the braking toothed wheel 114 is engaged with, for example, the toothed wheels 109 and 110 fitted in the clutch shaft 22, because it is sufficient that the braking toothed wheel 114 may brake the clutch shaft 22. The brake means K serves also as parking brake means when the tractor is stopped travelling.

Detailed description will now be made of the auxiliary transmission E referring to FIG. 3.

Auxiliary transmission shaft 122 is secured to the front wall 123 and the intermediate wall 124 of the auxiliary transmission case 8 by bearings 125 and is disposed co-axially with the clutch shaft 22. The splines 126 of the auxiliary transmission shaft 122 project from the front wall 125 into the intermediate case 7, and the auxiliary transmission shaft 122 faces the clutch shaft 22. Splined toothed wheels 127 and 128 fitted in the auxiliary transmission shaft 122, are axially spaced from each other and have a diameter different from each other.

A drive pinion shaft 129 is disposed as a travelling system drive shaft, and the bevel pinion 130 thereof is engaged with the crown gear 131 of the differential means F. The travelling system drive shaft 129 is secured to the front wall 123 and the intermediate wall 124 by a pair of bearings 132 and is disposed in parallel with and below the auxiliary transmission shaft 122. Auxiliary transmission toothed wheel 133 is slidably fitted into the travelling system drive shaft 129.

In such a construction, when auxiliary transmission toothed wheel 133 is selectively engaged with the toothed wheel 127 or 128 on the auxiliary transmission shaft 122, auxiliary second-stage speed change may be provided. The auxiliary transmission toothed wheel 133 may be operated by the operating means 13 as shown in FIG. 1. In accordance with the embodiment shown in FIG. 3, a driving toothed wheel 134 is securely fixed to the travelling system drive shaft 129, and an intermediate toothed wheel 137 is rotatably fitted into the PTO shaft 136 which is connected to the PTO transmission shaft 23 by a coupling 135 and extends in the rear direction, and the intermediate toothed wheel 137 is engaged with the driving toothed wheel 134. If power take-off means having a power take-off toothed wheel to be engaged with the intermediate toothed wheel 137 is disposed instead of a lid member 139 closing an opening 138 at the lower portion of the auxiliary transmission case 8 shown in FIG. 3, power may be utilized for driving the front wheels or the like.

Referring again to FIGS. 3 and 5, description will now be made of the super-reduction gear I and the PTO operating device J for traction starting incorporated in the intermediate case 7.

In the super-reduction gear I, a pinion 140 is fitted in and retained to the rear end of the clutch shaft 22 by a retaining ring 142, with space for engagement portion 141 of the clutch shaft 22 left. A gear wheel 143 is rotatably fitted into the splines 126 of the auxiliary transmission shaft 122 through bush or metal 144, and a recessed engagement portion 145 is provided at the front part of the gear wheel 143.

A clutching toothed wheel 146 is slidably fitted into the splines 126 of the auxiliary transmission shaft 122. When this clutching toothed wheel 146 is slid to the left direction in FIG. 5, the clutch shaft 22 is connected to the auxiliary transmission shaft 122. On the other hand, when this clutching toothed wheel 146 is slid to the right direction and engaged with the engagement portion 145 of the gear wheel 143, the gear wheel 143 is united to the auxiliary transmission shaft 122, whereby superreduction action is provided.

A super-reduction gear 147 comprises a gear wheel 148 always engaging with the pinion 140 on the clutch shaft 22, and a pinion 149 always engaging with the gear wheel 143 on the auxiliary transmission shaft 122. The shaft 152 of the super-reduction gear 147 is secured to a pair of projections 150 of the lid 17 closing the intermediate case opening. The super-reduction gear 147 is thus formed in the cassette type. Namely, when the lid 17 is closed, the gear wheel 148 and the pinion 149 of the super-reduction gear 147 are engaged with the toothed wheels 140 and 143, respectively, from above.

When the super-reduction gear 147 is incorporated into the lid 17 as shown in FIG. 6, the vertical distance may be reduced by disposing the shaft 152 of the super-reduction gear 147 eccentrically with respect to the clutch shaft 22 or the auxiliary transmission shaft 122. An operating means 18 for operating the clutching toothed wheel 146 and the switching member of the PTO operation device J to be described later may also eccentrically be disposed with respect to the clutch shaft 22 or the auxiliary transmission shaft 122.

In FIG. 6, an operation base 153 is placed on and fixed to the lid 17. An operation rod 154 is made to stand through a sphere member 155 incorporated in the operation base 153. Fork shafts 156 and 157 in parallel with each other are supported by the lid 17, and engagement portions 158 and 159 are disposed at the fork shafts 156 and 157, respectively. The lower end of the operation rod 154 may be engageable with these engagement portions 158 and 159. A fork 160 is securely fixed to the engagement portion 158, and engaged with the clutching toothed wheel 146.

An interlocking rod 162 secured to the side wall of the intermediate case 7 through a supporting shaft 161, is engaged with the engagement portion 159 through a spherical joint 163. A fork (not shown) interlocking with this interlocking rod 162 is disposed so as to be engaged with the switching member of the PTO operating device J.

Description will now be made of the PTO operating device J.

In FIGS. 3 and 5, a sleeve 164 is securely fixed to the PTO transmission shaft 23 in the intermediate case 7. A toothed wheel 66 which is engaged with the smallest toothed wheel 97 on the clutch output shaft 92, is rotatably fitted in the sleeve 164 through the needle bearing 165, the toothed wheel 166 being provided at the boss thereof with an engagement portion 167. A fixed sleeve 168 fitted in the PTO transmission shaft 23 is disposed adjacent the engagement portion 167 of the toothed wheel 166, and is provided at the periphery thereof with splines having a diameter same as the engagement portion 67. A switching member is generally designated by 169 and slidably fitted in the fixed sleeve 168.

If the first or second hydraulic clutch type transmissions B or D is troubled or goes out of order for some reasons, the operating rod 154 of the operating means 18 is operated so as to slide the switching member 169 to the right direction in FIGS. 3 and 5, whereby the fixed sleeve 168 and the toothed wheel 166 are united to each other at the switching member 169. Power from the engine is then transmitted by the four-stage geared transmission C. Thus transmitted torque is then transmitted to the clutch shaft 22 by interlocking of the toothed wheel 97 on the clutch output shaft 92 and the toothed wheel 110 on the clutch shaft 22, and is further transmitted to the auxiliary transmission E through or not through the superreduction gear I by engagement or disengagement of the clutching toothed wheel 146. Thus transmitted torque is further transmitted to the differential gear F and the final reduction gear G, thereby to drive the rear wheels 3.

If the engine 4 is started with difficulty due to defect of a starter or overdischarge of batteries, torque may be transmitted in the reverse direction as mentioned above, namely, from the rear wheels 3 to the auxiliary transmission E through the final reduction gear G and the differential gear F, by tracting the tractor by other tractor and setting the switching member 169 to the connection position. The main shaft 21 is then driven through the PTO transmission C and the engine will be started if the clutch 12 has been connected.

Figure 7:
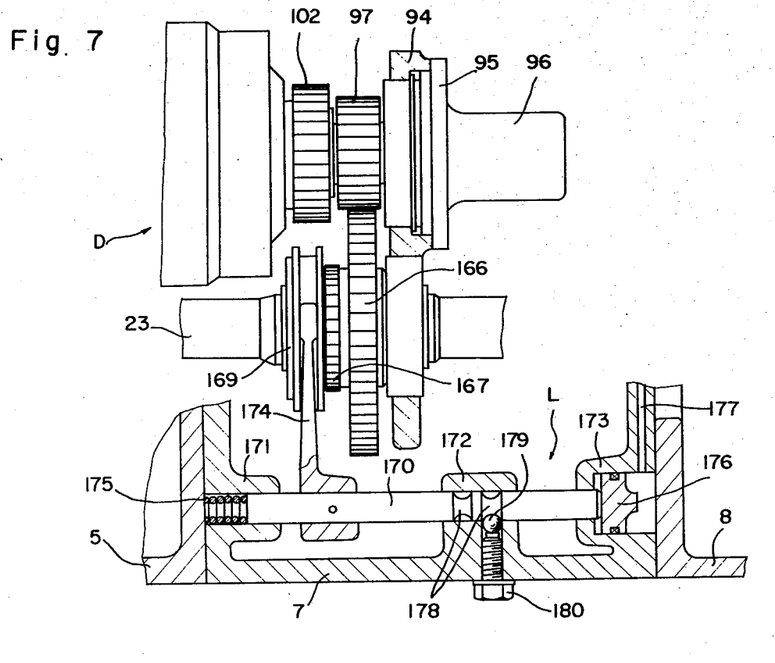
FIG. 7 is a vertical section view showing an example of a traction starting device.

Referring now to FIG. 7, description will be made of automatic clutching means L which may be efficient when the switching member 169 will be used for starting traction.

In FIG. 7, a fork shaft 170 is slidably mounted to bosses 171, 172 and 173 projecting in the intermediate case 7. A fork 174 engageable with the switching member 169 is securely fixed to the fork shaft 170, which is so spring-loaded by an elastic member 175 shown as coil spring in FIG. 7 that the switching member 169 is directed to the connection position.

An actuator 176 is fitted in the boss 173 disposed at the opposite side to the elastic member 175, and highly pressurized oil may be sent to this actuator 176 from the valve assembly 58 through oil passage 177.

The fork shaft 170 is provided with two peripheral grooves 178, in which a ball 179 may be carried out by a bolt 180 threaded from the outside of the side wall of the intermediate case 7. The ball 179 is normally fastened by the bolt 180 so as to be engaged with one of peripheral grooves 178, and the elastic member 175 is compressed, thereby to position the switching member 169 at the disconnection position. When so-called engine starting by traction action is intended to be carried out for the reason as mentioned earlier, the ball 179 may be disengaged from the peripheral groove 178 by loosening the bolt 180, so that the fork shaft 170 is slid to the right direction in FIG. 7 by action of the elastic member 175, thereby to slide the switching member 169 to the connection direction, whereby engine starting by traction action is realized. When the engine 4 is thus started to operate the pump and highly pressurized oil is sent to the actuator 176 from the valve assembly 58, the actuator 176 may slide the fork shaft 170 to the left side in FIG. 7 against the elastic member 175, thus the switching member 169 is automatically disconnected.

Although a particular embodiment of the present invention has been described hereinbefore, it will be apparent that the present invention may variously be embodied within the scope of the present invention.

We claim:

1. A transmission for a tractor, comprising:
a main shaft to receive engine power;
a travelling speed change shaft disposed in parallel with said main shaft;
a PTO speed change shaft disposed in parallel with said two shafts;
a first travelling speed change means of a hydraulic clutch type mounted on said travelling speed change shaft and having travelling speed change input gears;
a PTO speed change means of a mechanical clutch type mounted on said PTO speed change shaft and having plural PTO speed change gears;
a plurality of power transmission gears fixed on said main shaft for transmitting power to said travelling speed change input gears and said PTO speed change gears with at least one of said power transmission gears serving as a dual-purpose transmission gear to transmit power not only to one of said travelling speed change input gears but also to one of said PTO speed change gears;
a second travelling speed change means of a hydraulic clutch type connected to a rear end of said main shaft and having travelling speed change output gears, said second travelling speed change means being so constructed that, in response to power input from said main shaft, a clutch function thereof is performed prior to a speed change function thereof; and
a plurality of travelling speed change gears fixed on said travelling speed change shaft and engaged with said travelling speed change output gears of said second travelling speed change means.

2. A transmission as set forth in claim 1, wherein said first hydraulic clutch type travelling speed change means comprises a clutch means for backward travelling and a clutch means for first-stage forward travelling.

3. A transmission as set forth in claim 2, wherein said power transmission gears each have a different diameter, said backward travelling clutch means and said first-stage forward travelling clutch means being so disposed that the largest diameter gear among said power transmission gears disposed on said main shaft lies halfway between said two clutch means.

4. A transmission as set forth in claim 3, wherein said second hydraulic clutch type travelling speed change means comprises clutch means for second-stage, third-stage and fourth-stage forward travelling.

5. A transmission as set forth in claim 4, wherein said second-stage forward travelling clutch means has a clutch output shaft and a travelling speed change output gear fixed on said clutch output shaft said third-stage forward travelling clutch means has a further travelling speed change output gear rotatably mounted on said clutch output shaft, and said fourth-stage forward travelling clutch means has a still further travelling speed change output gear rotatably mounted on said main shaft.

6. A transmission as set forth in claim 2, wherein a pair of inner hubs are disposed between said backward travelling clutch means and said first-stage forward travelling clutch means, said backward travelling clutch means is secured to a main transmission case through a thrust bearing and an elastic member at a front end thereof, and said first-stage forward travelling clutch means is secured to the main transmission case through a further thrust bearing at the rear end thereof.

7. A transmission as set forth in claim 2, further comprising a brake means adapted to prevent inertial rotation of said travelling speed change shaft, said brake means having a break gear engaged with one of said travelling speed change gears fixed on said travelling speed change shaft and being constructed so as to apply a braking action in association with a clutch-off operation of said first hydraulic clutch type travelling speed change means or said second hydraulic clutch type travelling speed change means.

8. A transmission as set forth in claim 7, further comprising a valve assembly disposed for said first and second hydraulic clutch type travelling speed change means, a drain from said valve assembly being introduced to said brake gear for cooling the same.

9. A transmission as set forth in claim 5, further comprising an input coupling fixed to the rear end of said main shaft and a pilot bearing supported by said input coupling, said pilot bearing journalling a front end of said clutch output shaft of said second hydraulic clutch type travelling speed change means.

* * * * *

UNITED STATES PATENT AND TRADEMARK OFFICE
CERTIFICATE OF CORRECTION

PATENT NO. : 4,294,130
DATED : October 13, 1981
INVENTOR(S) : HIROYUKI KISAKA ET AL It is certified that error appears in the above—identified patent and that said Letters Patent is hereby corrected as shown below:

Column 1, line 10, "seed" should be --speed--.

Column 3, lines 62 and 63, delete "are adapted to be driven by power transmission toothed wheels".

Column 5, line 58 "operating" should be --opening--.

Column 11, line 12, "66" should be --166--.

Signed and Sealed this

Thirtieth Day of March 1982

[SEAL]

Attest:

GERALD J. MOSSINGHOFF

Attesting Officer  Commissioner of Patents and Trademarks